US005429339A

United States Patent [19]

Sugiyama

[11] Patent Number: 5,429,339

[45] **Date of Patent: * Jul. 4, 1995**

[54] ROPE TRACTION DEVICE

[75] Inventor: Yutaka Sugiyama, Tokyo, Japan

[73] Assignee: Nihon Biso Kabushiki Kaisha, Tokyo, Japan

[ * ] Notice: The portion of the term of this patent subsequent to Apr. 5, 2011 has been disclaimed.

[21] Appl. No.: 121,769

[22] Filed: Sep. 15, 1993

Related U.S. Application Data

[63] Continuation-in-part of Ser. No. 892,414, Jun. 1, 1992, Pat. No. 5,299,780, which is a continuation of Ser. No. 373,904, Jun. 29, 1989, abandoned.

[30] Foreign Application Priority Data

Sep. 12, 1988 [JP] Japan ................................ 63-311447

[51] Int. Cl.[6] .......................... B66D 1/00; B66D 1/30; B60T 13/04; B65H 20/00

[52] U.S. Cl. .................................... 254/333; 254/371; 254/375; 188/72.3; 188/170; 188/171; 188/173; 226/190

[58] Field of Search ............... 254/333, 371, 372, 375, 254/376; 464/160; 188/170, 171, 173, 72.3; 474/179, 180, 181, 182, 183, 175; 226/190, 193

[56] References Cited

U.S. PATENT DOCUMENTS

| | | | |
|---|---|---|---|
| 286,323 | 10/1883 | Martindale | 474/179 |
| 459,588 | 9/1891 | Lewis | 474/175 |
| 494,131 | 3/1893 | Edmunds | 226/193 |
| 728,850 | 5/1903 | Brigel | 474/175 |
| 1,408,209 | 2/1922 | Kleber | 254/375 |
| 1,613,895 | 1/1927 | Kitchell | 254/372 |
| 2,181,359 | 11/1939 | Barrett | 254/375 |
| 2,552,928 | 5/1951 | Benson | 254/376 |
| 3,017,780 | 1/1962 | Keinhofer | 226/193 |
| 3,078,074 | 2/1963 | Benedict | 254/333 |
| 3,426,979 | 2/1969 | Gigante | 254/376 |
| 3,635,441 | 1/1972 | Haines | 254/371 |
| 3,784,165 | 1/1974 | Pruitt | 254/375 |
| 3,819,155 | 6/1974 | Smith | 254/371 |
| 4,077,271 | 3/1978 | Mathews | 254/390 |
| 4,681,301 | 7/1987 | Rinio | 254/333 |
| 4,828,225 | 5/1989 | Owen et al. | 254/382 |
| 4,834,341 | 5/1989 | Baum | 254/375 |
| 5,031,880 | 7/1991 | Sugiyama | 254/375 |
| 5,299,780 | 4/1994 | Sugiyama | 254/333 |

FOREIGN PATENT DOCUMENTS

| | | | |
|---|---|---|---|
| 392341 | 12/1908 | France | 474/175 |
| 181065 | 2/1907 | Germany | 474/181 |

*Primary Examiner*—Daniel P. Stodola
*Assistant Examiner*—Michael R. Mansen
*Attorney, Agent, or Firm*—Burgess, Ryan & Wayne

[57] ABSTRACT

A rope traction device used as a winding instrument for a moving scaffold and other construction, loading and unloading and conveying machines, includes a sheave which is rotated by a motor through a speed reduction gear and around which a part of a traction rope is wound, and is movable along the rope by rotating the sheave. The sheave is provided with a rope groove formed by a pair of parallel and planar side plates substantially along the entire circumference of the sheave for receiving a part of the rope therein and resiliently pressing the rope on its side portions. The rope traction device includes an improved brake system according to which slots elongated in the circumferential direction are formed in each clutch member and each slot has a greater depth axially in the central portion thereof than in other portions. Steel balls are provided in the slots so as to be movable between the central portion and other portions of the slots so as to change the distance between the clutch members and thereby apply and release the brake.

6 Claims, 6 Drawing Sheets

ROPE TRACTION DEVICE

REFERENCE TO RELATED APPLICATION

This application is a continuation-in-part of application Ser. No. 07/892,414, filed Jun. 1, 1992, now U.S. Pat. No. 5,299,780, issued Apr. 5, 1994 to by Yutaka Sugiyama and entitled ROPE TRACTION DEVICE, which in turn, is a continuation of U.S. patent application Ser. No. 07/373,904, filed Jun. 29, 1989 by Yutaka Sugiyama and entitled ROPE TRACTION DEVICE, now abandoned.

BACKGROUND OF THE INVENTION

This invention relates to improvements in a rope traction device used for winding instruments for construction, loading and unloading, and conveying machines including moving scaffolds, elevators and cranes, and particularly is directed to an improvement in the reliability and durability of the rope traction device.

A rope traction device is a type of winding instrument used for construction, loading and unloading, and conveying machines such as moving scaffolds, elevators and cranes, and is capable of moving up and down along a rope with the rope wound around its sheave by only one or a few windings, and without winding the rope around and feeding it from a drum.

An example of a prior art rope traction device used for moving a scaffold up and down to perform work along an exterior wall surface of a building, is shown in FIGS. 3 and 4. This rope traction device includes a frame 1, a drive shaft 2 mounted on the frame 1, a motor 3 provided on the outer periphery of drive shaft 2 through a bearing, and a sheave 4 driven by motor 3. The rope traction device further includes a traction mechanism 6 for holding a rope 5 wound about sheave 4 by one winding, for preventing rope 5 from slipping off sheave 4, and further includes a brake mechanism 7.

Traction mechanism 6 includes an L-shaped pivoting arm 8 provided in the vicinity of a point at which rope 5 is disengaged from sheave 4. A pair of rollers 9, 9 are rotatably mounted at one end of pivoting arm 8 to press rope 5 inwardly from a linearly tightened state thereof. Another pair of rollers 10, 10 are rotatably mounted on a pivoting arm 11 which is pivotally mounted at the other end of pivoting arm 8.

According to this structure, as rope 5 becomes tightened linearly, rollers 9, 9, which are in contact with rope 5, are pushed outwardly by rope 5. Pivoting arm 8 is thereby pivoted in a counterclockwise direction, as viewed in FIG. 4, to cause rope 5 to be pressed by rollers 10, 10 into the groove of sheave 4.

The output shaft of motor 3 is coupled to drive shaft 2 and a wheel 14 of an intermediate shaft 13 is in meshing engagement with a pinion 12 provided on drive shaft 2. A second pinion 15 on intermediate shaft 13 is in meshing engagement with a gear 20 of a brake wheel 19 having a female screw 18 which is in threaded engagement with a male screw 17 of a driven shaft 16. A pinion 21 formed at the end portion of driven shaft 16 is in meshing engagement with a ring gear 22 which is secured to sheave 4 by means of bolts. A flange portion 23 is formed on driven shaft 16 in a manner which opposes brake wheel 19. Linings 24, 24 are provided on opposing surfaces of flange portion 23 and brake wheel 19. A brake disk 26 which can rotate in one direction only through frame 1 and a ratchet 25 are provided between flange portion 23 and brake wheel 19.

When it is desired to elevate the rope traction device by rotating sheave 4 clockwise as viewed in FIG. 4, driven shaft 16 is rotated counterclockwise. Since ratchet 25 is free in this direction, brake wheel 19, with its female screw 18 in threaded engagement with male screw 17 of driven shaft 16, is displaced to the left as viewed in FIG. 3. This occurs by the rotation of brake wheel 19 which presses brake disk 26 against flange portion 23. Thus, brake wheel 19 is rotated integrally with driven shaft 16 to transmit the drive force to sheave 4.

When sheave 4 is rotated counterclockwise, that is, in a direction in which the rope traction device is lowered, brake disk 26 is locked by ratchet 25 and sheave 4 itself is in a loaded state. By the rotation of motor 3, brake wheel 19 is rotated in a direction in which brake wheel 19 is displaced to the right as viewed in FIG. 3. As a result, the rope traction device is lowered due to the load applied to sheave 4 by a distance corresponding to the gap produced in brake disk 26. The rope traction device is lowered by the repeated release and engagement of the brake.

In traction mechanism 6 in which rope 5 is pressed against sheave 4 by the pair of rollers 10, 10 mounted on pivoting arm 11, a bending moment is repeatedly applied to rope 5. This occurs at points of contact with the V-shaped groove of sheave 4 at two positions at which rollers 10, 10 press against rope 5. In addition, rollers 10, 10 tend to slip sideways by a force applied in a transverse direction due to twisting of rope 5. For these reasons, wear occurs in rope 5 and the life of rope 5 is thereby shortened.

Further, as wear occurs in rope 5 and its diameter is thereby reduced, the position of pivoting arm 8 before pivoting is changed. As a result, the pressing force, that is, the traction force obtained by the inward displacement of rollers 9, 9 is changed, resulting instability in the traction force.

It is, therefore, an object of the invention to provide a rope traction device which is capable of producing a large rope pressing force and ensuring a prolonged life of the rope without causing excessive wear.

In brake mechanism 7 in which the braking force is produced by the screw mechanism between brake wheel 19 and driven shaft 16, the force produced by screws 17 and 18 is weak when the load is relatively small. This gives rise to the problem that the grease used for lubricating the component parts such as wheels located near linings 24, 24 contaminates linings 24, 24. The force produced by screws 17 and 18 is too small to force the grease out of linings 24, 24 with the result that the braking force is decreased.

There is another problem with brake mechanism 7. When a large force such as an impact force has been applied to brake mechanism 7, there is the likelihood that the tightening force produced between screws 17 and 18 becomes excessively large, resulting in malfunction of the brake.

In brake mechanism 7 in which release and application of the brake are repeated frequently during lowering of the rope traction device, grease tends to deteriorate due to heat of friction produced in linings 24, 24 when the distance of downward movement of the rope traction device is long. As a result, linings 24, 24 tend to be burnt and the braking efficiency is seriously reduced.

It is therefore another object of the invention to provide a rope traction device capable of producing a stable braking force regardless of magnitude of the load applied to the brake mechanism.

SUMMARY OF THE INVENTION

A rope traction device includes a sheave which is rotated by a drive source through a speed reduction device and around which a part of a rope is wound, the rope traction device being movable along the rope by rotating the sheave.

In accordance with a first object of the present invention, the rope traction device comprises rope groove forming means provided substantially along the circumference of the sheave for forming a groove to receive a part of the rope therein and resiliently pressing side portions of the rope, and guide rollers provided along the outer periphery of the rope groove forming means for guiding the rope along the groove.

According to the invention, the rope groove includes means provided substantially along the circumference of the sheave which presses the rope at its side portions so that the rope is pressed over substantially the entire circumference of the sheave and local generation of a bending moment is thereby prevented. Therefore, wear of the rope can be minimized so that the life of the rope can be prolonged and a stable traction force can be obtained.

In a preferred embodiment, the rope groove forming means is constructed of a pair of planar plate springs of a generally annular configuration. Preferably, the inner surfaces of the plate springs are parallel with each other. The diameter of the rope is larger than the inner width between the plate springs, but the rope can be inserted between the pair of plate springs or pulled out from the pair of plate springs by the elastic or resilient nature of the plate springs.

In one aspect of the invention, the pair of plate springs are each formed with a plurality of slots. The rope bulges into these slots so as to increase the rope holding force. The above effect is realized by the elastic or resilient nature of the pair of plate springs. If the rope groove forming means is not elastic or resilient, the rope groove forming means does not press the rope, and the rope does not bulge into the slots.

In another aspect of the invention, the width of the pair of rollers provided at the entrance and the exit of the rope groove forming means is made slightly larger than the diameter of the rope. With this arrangement, the feeding of the rope into and out of the rope groove is facilitated.

In still another aspect of the invention, the bottom surface of the rope groove forming means is formed with projections or depressions for increasing friction between the rope and the rope groove. With this arrangement, there is an increase in friction and a resulting increase in the rope traction force.

In accordance with a second object of the invention, the rope traction device comprises clutch means including a first clutch member provided on an output shaft of the drive source and a second clutch member provided on an input shaft of the speed reduction device. Each clutch member has a flange and engaging means provided on the flange for engaging the other clutch member. Brake means is provided which is axially slidably about the outer periphery of the first clutch member and has a braking flange portion disposed about the outer periphery of the flange of the first clutch member, with the flange portion of the brake means opposing the flange of the second clutch member. Brake urging means is provided for urging the flange portion of the brake means axially toward the flange of the second clutch member, and a brake disk is provided between the braking flange portion of the brake means and the flange of the second clutch member. A slot forming means is provided for forming slots elongated in the circumferential direction in each of the clutch members of the clutch means, with the slots having a depth in the central portion thereof, measured in the axial direction, which is greater than in other portions thereof. Rolling members are also provided in the slots so as to be movable between the central portion and other portions thereof.

According to the invention, since the brake mechanism is constructed without employing a screw device and a ratchet, the brake mechanism is actuated only when the motor is not running, whereby deterioration of grease or burning of brake linings due to heating of the brake portion and malfunction of the brake due to overtightening of the screws can be eliminated, and a stable braking force can be ensured regardless of the magnitude of load applied to the brake.

BRIEF DESCRIPTION OF THE DRAWINGS

FIG. 7(*b*) is a side view similar to FIG. 7(*a*), showing rubbing of the edges of the circular and circumferentially elongated slots, in which the centers of the circular and circumferentially elongated slots are coincident.

DESCRIPTION OF A PREFERRED EMBODIMENT

Figure 1:
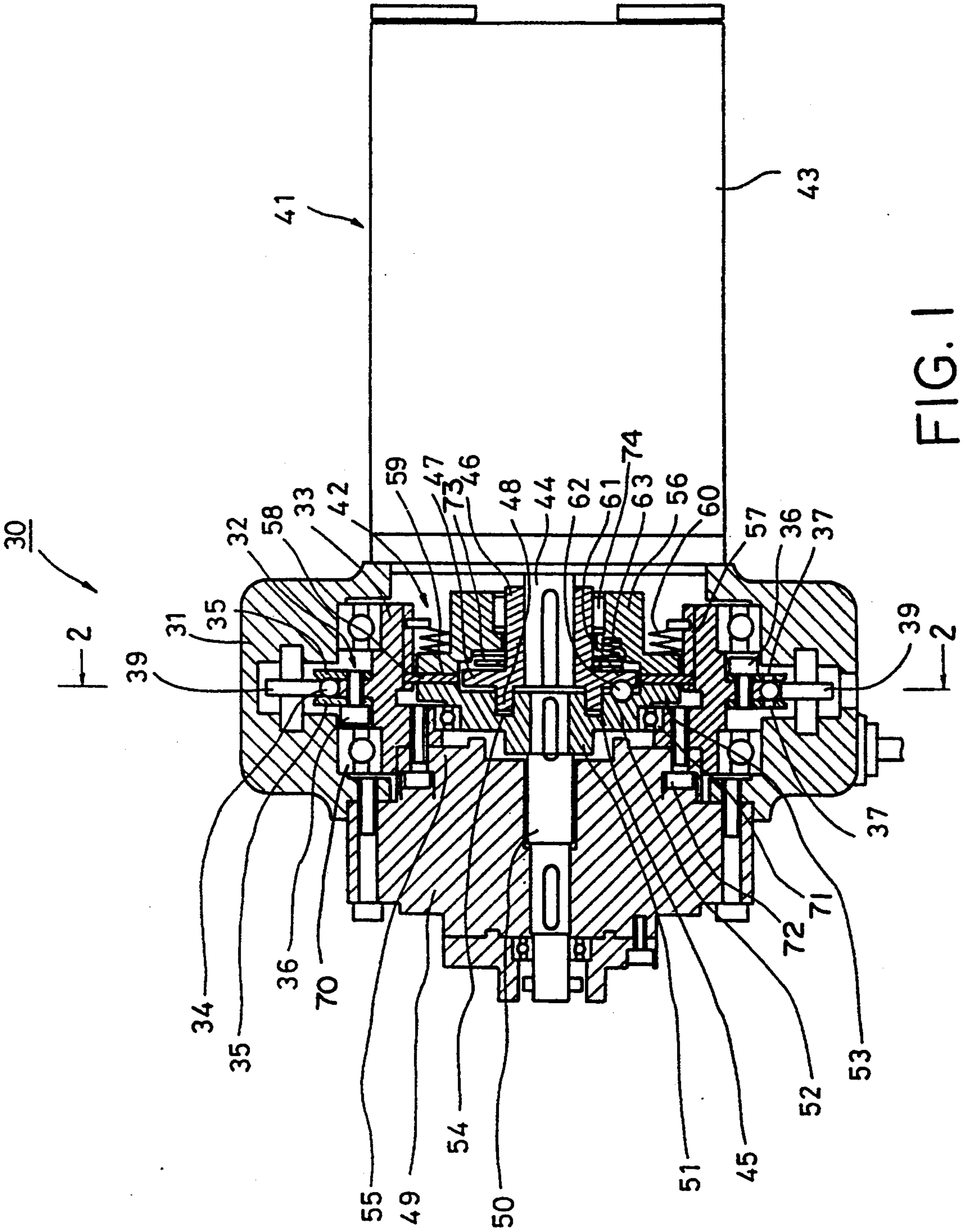
FIG. 1 is a vertical sectional view of a preferred embodiment of the rope traction device according to the invention.
Figure 2:
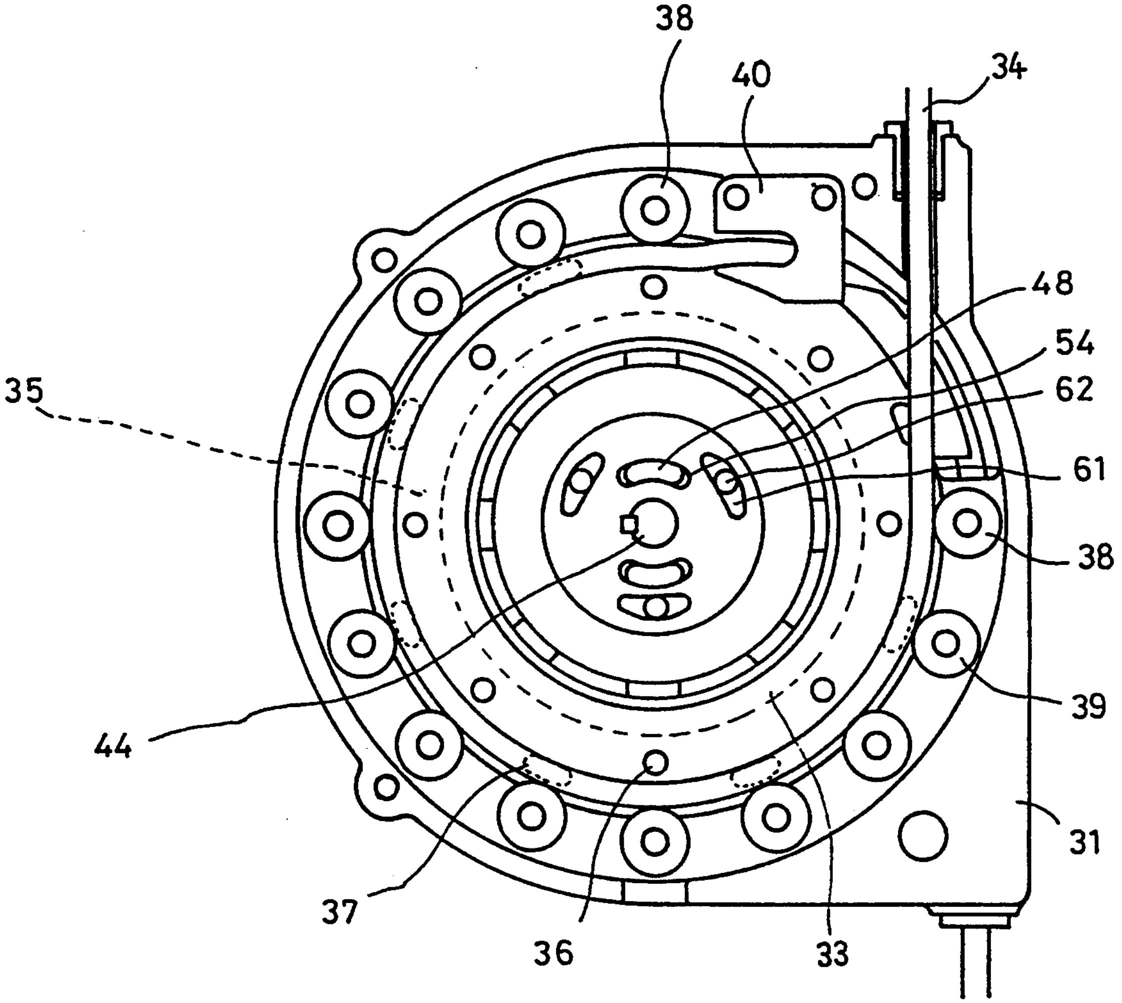
FIG. 2 is a sectional view of the device of FIG. 1, taken along line 2—2 thereof.
Figure 3:
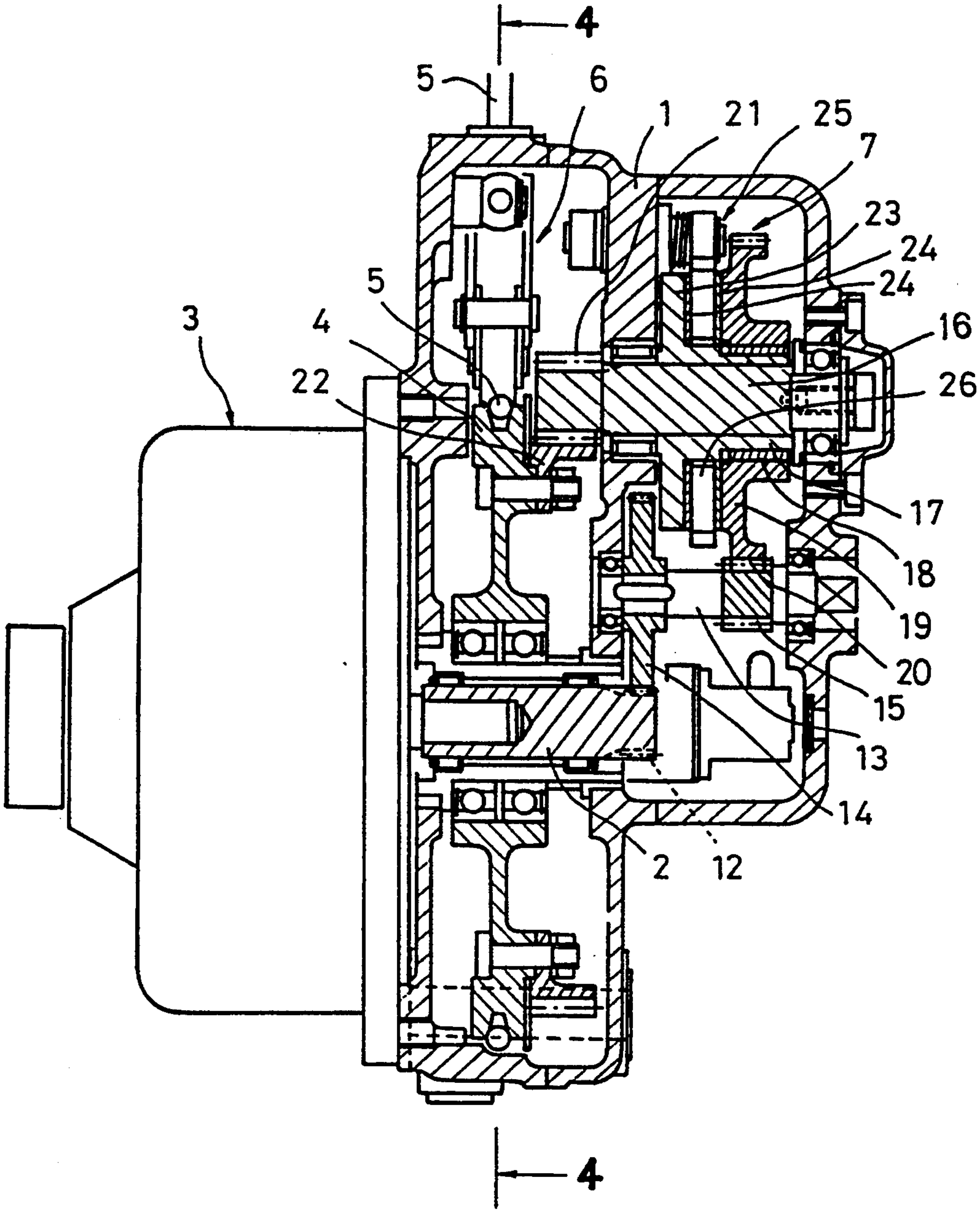
PRIOR ART FIG. 3
FIG. 3 is a vertical sectional view of a prior art rope traction device.
Figure 4:
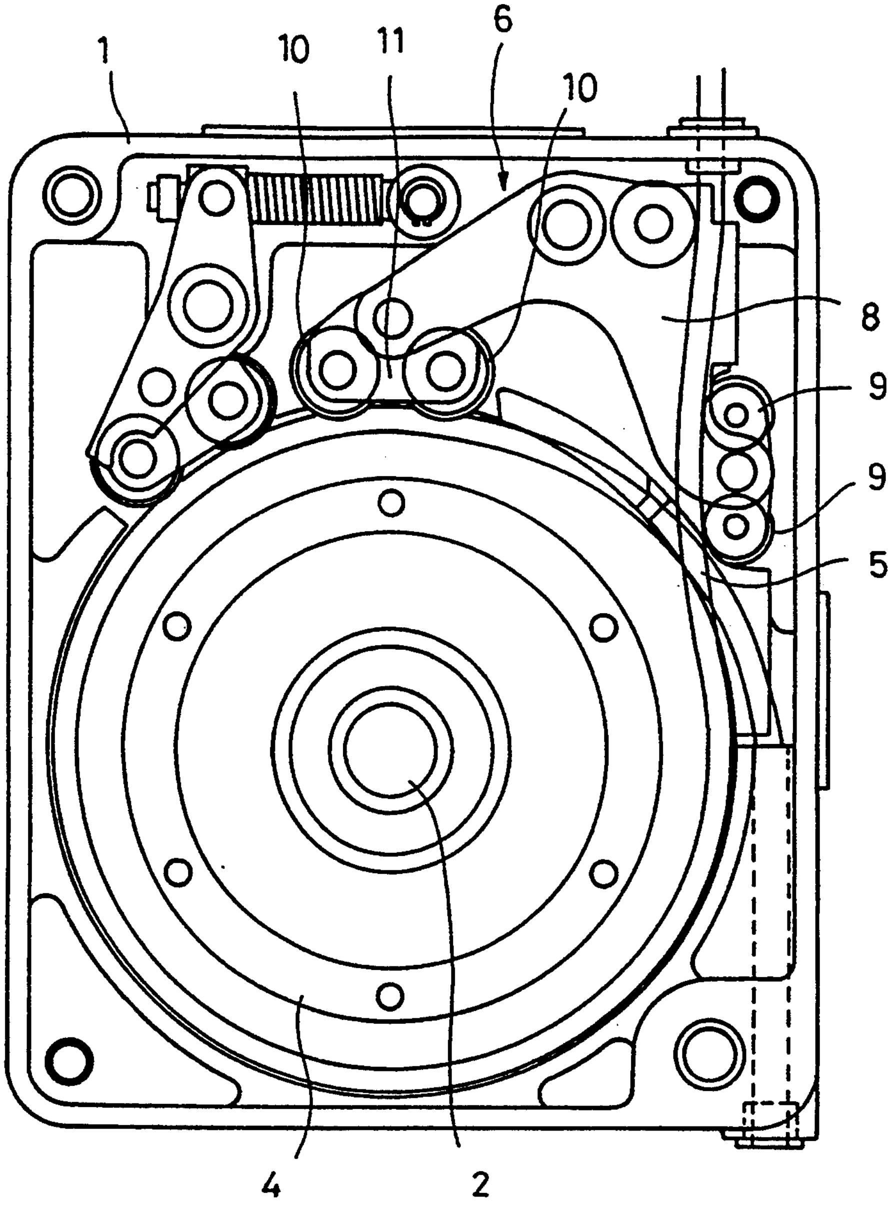
PRIOR ART FIG. 4
FIG. 4 is a sectional view of the device of FIG. 3, taken along line 4—4 thereof.
Figure 5:
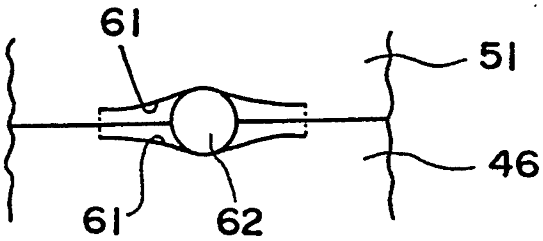
FIG. 5 is a cross sectional view of a slot formed in the clutch members, with a steel ball received therein.

Referring to FIGS. 1 and 2, an embodiment of a rope traction device 30 according to the present invention will now be described.

Specifically, rope traction device 30 includes a sheave 32 mounted on a frame 31, with sheave 32 including a sheave main body 33 and a pair of side plates 35, 35 mounted on both sides of sheave main body 33 so as to form a rope groove for a traction rope 34.

Figure 8:
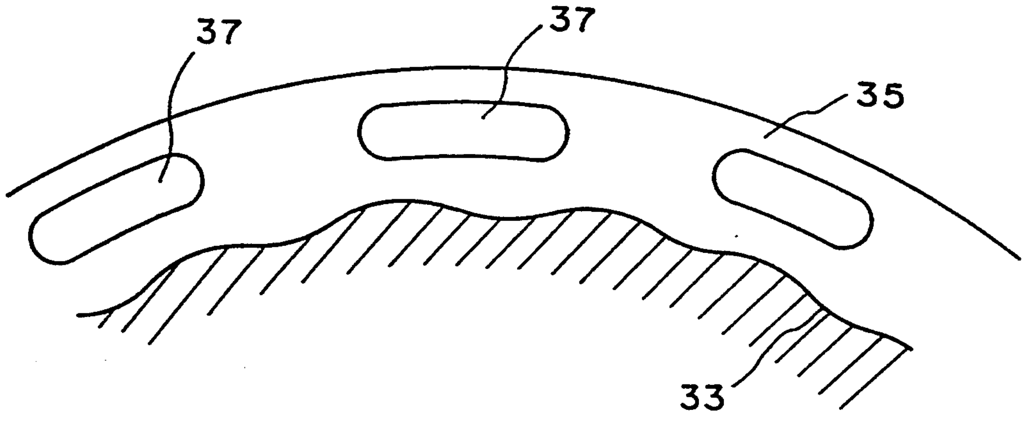
FIG. 8 is a sectional view showing the rope groove forming means, showing the projections and depressions in the bottom thereof.

Sheave main body 33 has a thickness in its outer peripheral portion which is slightly smaller than the diameter of rope 34, and the peripheral surface of the outer peripheral portion which defines the bottom of the rope groove is preferably formed with projections 300 or depressions 302 or both, as shown in FIG. 8, for increasing friction between rope 34 and the rope groove. In the present embodiment, the projections and/or depressions of the peripheral surface of sheave main body 33 preferably form a knurled surface. Sheave main body 33 is rotatably supported through ball bearings 70, 70 on frame 31 at peripheral surface portions thereof to the outside of the portion defining the bottom of the rope groove.

Side plates 35, 35, which are secured to sheave main body 33 and which constitute the rope groove forming means, are made of a pair of planar (flat) plate springs of a generally annular configuration. Side plates 35, 35 are provided substantially along the circumference of the sheave for forming a groove, and the inner sides of the pair of plate springs are parallel with each other. The plate springs thereby receive a part of traction rope 34 therein and resiliently press against the side portions of this part of the rope. The pair of side plates 35, 35 are secured to sheave main body 33 by means of bolts 36 on each side of sheave main body 33. Side plates 35, 35 have, in portions thereof which come into contact with rope 34, circumferentially elongated and circumferentially equidistant perforations or slots 37. Throughout this application, reference to slots 37 will mean slots, perforations, openings and the like. This arrangement allows rope 34 to bulge in when pressed by the pair of side plates 35, 35, thereby increasing the traction force due to a wedge action of rope 34. Because the inner sides of the pair of plate springs do not form a V-shape, but rather, are parallel with each, rope 34 can bulge in whole or part of the slots 37. Therefore, the shape of the pair of plate springs is very effective for increasing the traction force due to the wedge action of rope 34.

Before rope 34 bulges into the slots 37, rope 34 must be inserted in the rope groove forming means. It is noted that, if the rope groove forming means is not elastic or resilient, and with the inner width of the rope groove forming means being smaller than the diameter of rope 34, rope 34 cannot be inserted in the rope groove forming means. On the other hand, if the rope groove forming means is not elastic or resilient, and with the inner width of the rope groove forming means being equal to or greater than the diameter of rope 34, rope 34 can be inserted in the rope groove. However, in such case, the rope groove forming means would not press the rope, so that rope 34 could not bulge into the slots 37, whereby a frictional force would not be exerted between rope 34 and the rope groove forming means.

Figure 6:
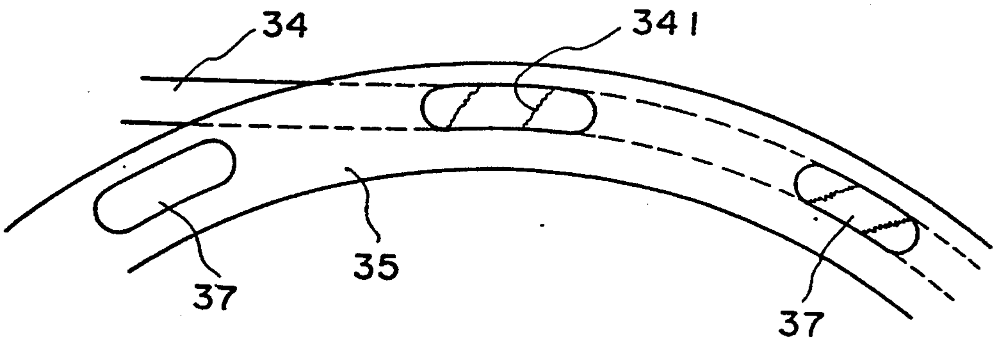
FIG. 6 is a side view of the plate springs when the rope is about to bulge into the slots thereof.

Therefore, the rope groove forming means must be elastic or resilient, such as the aforementioned pair of plate springs 35, 35 having an inner width therebetween which is smaller than the diameter of rope 34, for receiving the rope into the rope groove forming means. As a result, rope 34 will bulge into the slots 37, as shown in FIG. 6, creating a strong frictional force between rope 34 and the rope groove forming means.

It is advantageous to use circumferentially elongated slots 37 rather than circular slots 37'. The reason for this is as follows. Before rope 34 bulges into the slots 37 (and after rope 34 is removed from slots 37), the direction of movement of rope 34 is different from the direction of movement of plate springs 35, 35. In such case, rope 34 rubs the inner surfaces of the pair of plate springs 35, 35, because the width of rope 34 is larger than the inner width of the pair of plate springs 35, 35 and the rope must move in plate springs 35, 35 by wrenching the inner sides of the pair of plate springs 35, 35. When rope 34 rubs the inner surfaces of plate springs 35, 35, rope 34 eventually rubs the edge of slots 37, and rubbing the edge of slots 37 denigrates the surface of rope 34, causing wear of rope 34. The extent of the wear of rope 34 in the case of circumferentially elongated slots 37 is less than the wear of rope 34 in the case of circular slots 37'.

Figure 7A:
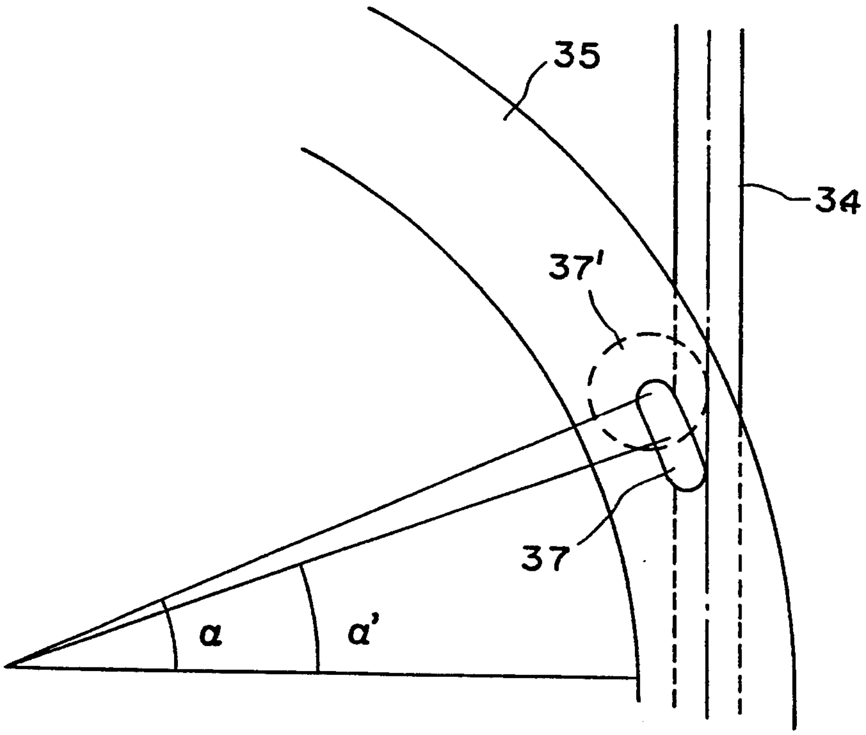
FIG. 7(*a*) is a side view showing the rope beginning or finishing rubbing the edges of circular or circumferentially elongated slots, with the diameter of the circular slots being equal to the length of the circumferentially elongated slots.
Figure 7B:
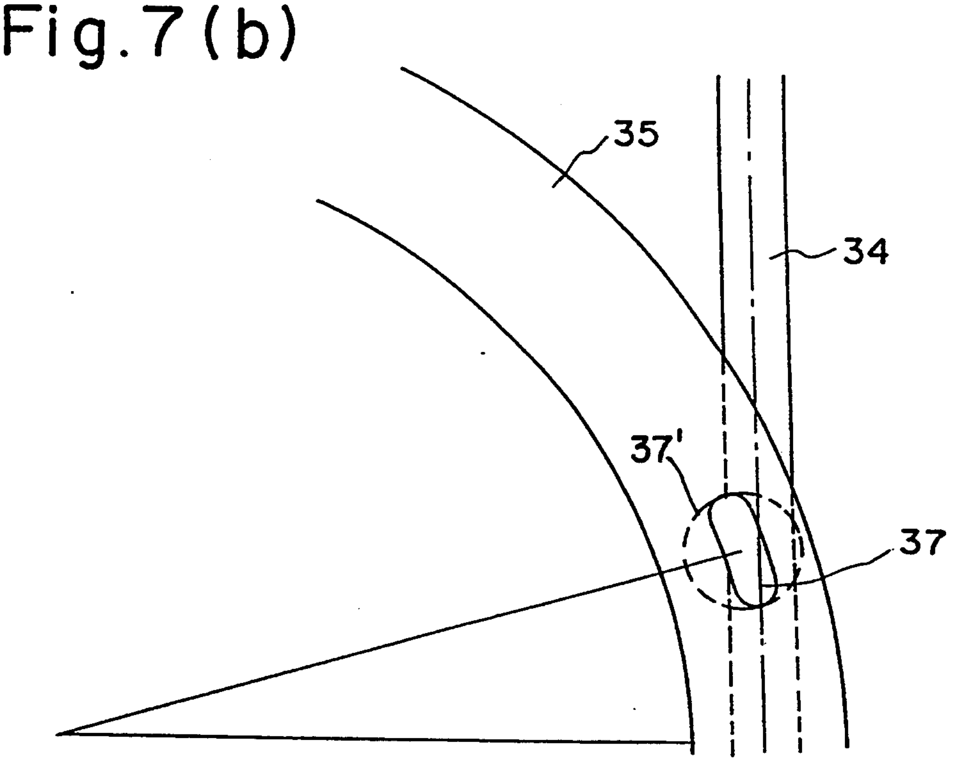

This is best shown by FIG. 7(*a*), which shows the case where the diameter of circular slots 37' is equal to the maximum length of circumferentially elongated slots 37. In such case, the angle $\alpha$ at which the rope 34 begins or finishes rubbing the edge of circular slots 37' is greater than the angle $\alpha'$ at which the rope 34 beings or finishes rubbing the edge of circumferentially elongated slots 37. Therefore, the period during which rope 34 rubs against the edges of circular perforations 37' is longer than the period during which rope 34 rubs against the edges of circumferentially elongated perforations 37.

As shown in FIG. 7(*b*), where the center of circular perforations 37' and the center of circumferentially elongated perforations 37 are coincident, the extent of frictional force caused by rope 34 rubbing the edge of each circular perforation or slot 37' is nearly equal to the extent of frictional force caused by rope 34 rubbing the edge of each circumferentially elongated perforation or slot 37. This is because the direction of movement of the edges of each perforation or slot 37'37' is identical in each case, and rope 34 rubs the edges points of each perforation or slot 37'37'at nearly identical positions, as shown in FIG. 7 (*b*) .

Since the period in which rope 34 rubs the edges of circular slots 37' is larger than the period in which rope 34 rubs the edges of circumferentially elongated slots 37, wear of rope 34 caused by rubbing the edges of circular slots 37' is greater than wear of rope 34 caused by rubbing the edges of circumferentially elongated slots 37.

For ensuring a smooth movement of rope 34 through the rope groove of the thus formed sheave 32, guide rollers 38 and 39 are equidistantly mounted on frame 31 on the outer peripheral side of sheave 32. Except for the pair of guide rollers 38, 38 which are provided at the entrance and the exit of the rope groove forming means, guide rollers 39 are disposed in such a manner that their outer peripheral portions are positioned between side plates 35, 35 in a non-contacting state. The width of each guide roller 38 is slightly larger than the diameter of rope 34 so that the guide rollers 38, 38 push side plates 35, 35 open to facilitate feeding of rope 34 into and out of the rope groove.

A fixed type rope guide 40 is provided on sheave main body 33 at a portion thereof positioned to the outside of guide roller 38 on the exit side of rope 34, for facilitating feeding of rope 34 out of the rope groove of sheave 32.

A drive mechanism 41 for driving sheave 32, and a brake mechanism 42 for applying a braking force to sheave 32 will now be described.

As a drive source, a motor 43 with a DC brake is mounted on frame 31. A clutch member 46 which constitutes a part of clutch means 45 is provided on an output shaft 44 of motor 43 so as to transmit the drive force of motor 43 and so as to be axially displaceable. Clutch member 46 is formed in its foremost end portion with a flange 47, and projections 48 are formed integrally with flange 47 for transmitting the drive force.

An input shaft 50 of a known reduction gear 49 is disposed coaxially with output shaft 44 of motor 43, and another clutch member 51 which constitutes a part of clutch means 45 is mounted on input shaft 50. Clutch member 51 is formed with a flange 52 which is of a larger diameter than flange 47 of clutch member 46, and a portion of flange 52 which extends radially outwardly of the outer periphery of flange 47 constitutes a brake flange 53. Clutch member 51 is formed, at locations opposite to projections 48 of flange 47, with arcuate clutch recesses 54 having a width slightly larger than the diameter of projections 48 and a length slightly larger than the length of projections 48. Ball bearings 71, 71 are provided between the outer peripheral surface of clutch member 51 and the inner peripheral surface of sheave main body 33 so that clutch member 51 is rotatably supported by sheave main body 33.

An output portion 55 of reduction gear 49 is connected integrally to sheave main body 33 by means of bolts 72 so as to transmit the drive force of motor 43 to sheave 32 through clutch means 45 and the reduction gear 49.

Brake mechanism 42 includes a brake member 56 is axially slidably mounted on the outer peripheral surface of clutch member 46 on the side of output shaft 44. Brake member 56 has a flange opposing brake flange 53. Needle thrust bearings 73 are provided between brake member 56 and the rear surface of flange 47 of clutch member 46, and needle bearings 74 are provided between brake member 56 and the outer peripheral surface of clutch member 46. A brake disk 58 is provided between brake member 56 and brake flange 53 of clutch member 51 so as to be axially slidable along a spline 57 formed on the inner peripheral surface of sheave main body 33. Brake linings 59 are secured on both sides of brake disk 58.

A spring 60 which constitutes the brake urging means is provided between the rear surface of brake member 56 and sheave main body 33 for urging the flange of brake member 56 axially toward brake flange 53 of clutch member 51. Thus, a braking force is applied by clamping brake disk 58 between brake flange 3 and brake member 56.

For engaging and disengaging this brake mechanism, three slots 61, which are elongated in the circumferential direction, are formed at equidistant intervals in each of flanges 47 and 52 of clutch members 46 and 51. Slots 61 each have a depth, as measured in the axial direction, at the central portion thereof, which is greater than the depths at other portions thereof, as shown in FIG. 6. Steel balls 62 which constitute rolling means are movably provided in slots 61 between the central portions thereof and the other portions thereof. The interval between flanges 47 and 52 is changed depending upon the position of steel balls 62 in slots 61. Springs 63 are provided between clutch member 46 and brake member 56 so as to prevent steel balls 62 from being disengaged from slots 61 when the interval between flanges 47 and 52 becomes large.

The operation of rope traction device 30 will now be described.

When rope traction device 30 is to be lifted along rope 34, motor 43 is driven in a direction in which rope 34 is wound, to thereby rotate sheave 32 clockwise as viewed in FIG. 2. On the other hand, when rope traction device 30 is to be lowered along rope 34,motor 43 is driven in a direction in which rope 34 is rewound, to thereby rotate sheave 32 counterclockwise as viewed in FIG. 2.

In either case, the rotational force of motor 43 is transmitted from output shaft 44 to clutch member 46 and further to the other clutch member 51 through the projections 48 and the recesses 54.

In a state where motor 43 is not running, steel balls 62 are positioned in the central portions of slots 61 which have the greatest depth. Accordingly, brake linings 59 of brake disk 58 are clamped between brake member 56 and brake flange 53. Also, sheave 32 and output shaft 44 of motor 43 are connected rigidly to each other through reduction gear 49, which has a large speed reduction ratio, so that engagement of the brake occurs.

If motor 43 is rotated from this state, clutch member 46, which is coupled to output shaft 44, is rotated, and slots 61 formed in flange 47 of clutch member 46 are thereby rotated. This causes steel balls 62 to move relatively in slots 61 from the central portions thereof to corners of slots 61. As a result, clutch member 46 is pushed back by steel balls 62. This, in turn, causes brake member 56 to be pushed back by clutch member 46 through spring 60, whereby the brake is disengaged and the drive force is transmitted to the other clutch member 51 so as to rotate sheave 32.

Thus, according to rope traction device 30, the brake is disengaged during lifting or lowering of rope traction device 30 and engaged only during stoppage of motor 43.

Further, rope 34 which is wound about sheave 32 by about one winding is located in the rope groove formed by side plates 35, 35 and guided by guide rollers 38 and 39. The driving force is transmitted to rope 34, which is clamped and pressed by side plates 35, 35 substantially along its entire circumference. Since slots 37 are formed in side plates 35, 35, the clamped and pressed rope 34 bulges into slots 37, and a wedge action is produced between slots 37 and rope 34, by pulling of the rope 34 so that efficiency of transmission of the power from sheave 32 to rope 34 is increased.

Since the peripheral surface of the rope groove forming means which defines the bottom of the rope groove, that is, corresponding to the part of the rope groove other than the sides of the rope groove formed by the pair of plate springs 35, 35, is knurled with projections or depressions, friction between sheave 32 and rope 34 is increased, with a resulting increase in the traction force.

As described, lifting and lowering of rope traction device 30 along rope 34 is performed under the condition where steel balls 62 are positioned in a portion of slots 61 in which the axial depth of slots 62 is smaller, whereby the brake is thereby disengaged. When there is a difference in the ratio of the number of revolutions between sheave 32, which is on the load side, and motor 43, that is, when the load is large during lowering, with the result that the number of revolutions of sheave 3 tends to become larger than normal, there arises a difference in the number of revolutions between clutch members 46 and 51. In such case, steel balls 62 move toward the central portion of slots 61 where the axial depth is the greatest, so that clutch member 46 and brake member 51 are biased by spring 60 to the left as viewed in FIG. 1. This causes brake disk 58 to be clamped between brake flange 53 and brake member 56, and thereupon, the brake starts to be engaged to thereby decrease the speed of lowering of sheave 32.

In rope traction device 30 in which the drive force is transmitted by using side plates 35, 35 made of plate springs, the rope is pressed substantially uniformly over its entire circumference so that a greater traction force can be obtained than in prior art devices in which traction force is obtained by pressing the rope with a pair of rollers. In addition, wear or breaking of the rope due to a concentrated load is reduced so that the life of the rope can be prolonged.

If the diameter of rope 34 has changed, a change in the traction force can be minimized since the rope is clamped and pressed on both sides thereof by side plates 35, 35 along its entire circumference. Thus, a stable traction force can be obtained and the reliability of the device is improved.

According to the invention, wearing of the rope groove can be minimized by simply replacing side plates 35, 35.

When a heavy load such as an impact force has acted upon rope 34, the effect of such load can be mitigated by slipping of rope 34 in the rope groove of sheave 32, and damage to the mechanical parts such as motor 43 can be prevented.

Since the brake is applied only during stoppage of the motor and the brake is disengaged during lifting and lowering of rope traction device 30, generation of heat from friction in brake linings 59 can be minimized even in the case where the distance of lifting or lowering is large so that deterioration of grease or burning or wear of the linings can effectively be prevented.

Since the ratchet mechanism of the prior art is not employed in the present invention, generation of noise is minimal. Further, since the screw device is not employed for applying the brake as in the prior art, malfunctions due to overtightening of the screw will not occur and overload can be mitigated.

The rope traction device according to the invention can be used for not only a winder for a moving scaffold but a winder for various other construction, loading and unloading and conveying machines.

A plurality of brake members may be used to compose a multi-plate type brake for increasing the brake force.

As the traction rope, a wire rope is preferable but other types of rope may be used as well depending upon load condition.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention as defined by the appended claims.

What is claimed is:

1. A rope traction device including a sheave which is rotated by a drive source through a speed reduction device and around which a part of a rope having a diameter is wound, and being movable along the rope by rotating the sheave, said rope traction device comprising:

rope groove forming means for forming a rope groove to hold a part of said rope around said sheave, said rope groove forming means including:
- a pair of substantially parallel and planar plate spring means, provided substantially along the circumference of the sheave, for:
  - forming said groove, and
  - resiliently pressing side portions of said part of the rope,
- a plurality of circumferentially elongated and circumferentially equidistant slots in said pair of plate spring means into which the rope bulges when said planar plate spring means resiliently press the side portions of said part of the rope, and
- an outer periphery; and guide rollers provided along the outer periphery of the rope groove forming means for guiding the rope along the groove, said guide rollers including a pair of guide rollers at an entrance and an exit of the rope groove forming means, and said pair of guide rollers each having a width slightly larger than the diameter of the rope.

2. A rope traction device as defined in claim 1, wherein said plate springs have a generally annular configuration.

3. A rope traction device as defined in claim 1, wherein said rope groove has a bottom, and said rope groove forming means has an inner surface which defines the bottom of the rope groove, said inner surface being formed with projection/depression means for increasing friction between the rope and the rope groove forming means.

4. A rope traction device as defined in claim 1, further comprising:

clutch means for connecting said drive source with said speed reduction device, said clutch means including a first clutch member provided on an output shaft of the drive source and a second clutch member provided on an input shaft of the speed reduction device, each said clutch member having a flange and engaging means provided on each said flange for engaging the clutch members with each other;

brake means for braking said rope traction device, said brake means being axially slidably about an outer periphery of the first clutch member and having a braking flange portion disposed about an outer periphery of the flange of the first clutch member, and said braking flange portion being in opposing relation to the flange of the second clutch member;

brake urging means for urging the braking flange portion axially toward the flange of the second clutch member;

a brake disk provided between the braking flange portion and the flange of the second clutch member;

a plurality of circumferentially elongated slots in each said clutch member, said slots in said clutch members having an axial depth in a central portion thereof which is greater than in other portions thereof; and rolling members provided in the slots of said clutch members and movable between the central portions and other portions thereof.

5. A rope traction device as defined in claim 4, wherein said engaging means for engaging the clutch members to each other includes a recess formed in one of the clutch members and a projection formed in the other clutch member and extending into said recess.

6. A rope traction device as defined in claim 5, wherein the rolling members are steel balls.

* * * * *